(12) United States Patent
Ren et al.

(10) Patent No.: US 12,694,894 B1
(45) Date of Patent: Jul. 28, 2026

(54) PRE-ASSISTING MICROWAVE MAGNETIC RECORDING BASED ON SPIN-HALL NANO-OSCILLATORS

(71) Applicant: Headway Technologies, Inc., Milpitas, CA (US)

(72) Inventors: Haowen Ren, Fremont, CA (US); Shehrin Sayed, Fremont, CA (US); Wenyu Chen, San Jose, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 19/246,433

(22) Filed: Jun. 23, 2025

(51) Int. Cl.
*G11B 5/31* (2006.01)
*G11B 5/02* (2006.01)
*G11B 5/00* (2006.01)

(52) U.S. Cl.
CPC ........ *G11B 5/02* (2013.01); *G11B 2005/0024* (2013.01)

(58) Field of Classification Search
CPC ........... G11B 5/31; G11B 5/11; G11B 5/3116; G11B 5/3146; G11B 5/235; G11B 5/3133; G11B 5/314; G11B 2005/0024; G11B 5/3983; G11B 5/37; G11B 5/374; G11B 5/3912; G11B 5/3954; G11B 5/398; G11B 2005/3996; G11B 5/1278
USPC ......................................................... 360/59
See application file for complete search history.

(56) References Cited

U.S. PATENT DOCUMENTS

| | | | |
|---|---|---|---|
| 10,580,441 B1 | 3/2020 | Chen et al. | |
| 10,867,626 B1 | 12/2020 | Li et al. | |
| 10,943,611 B1 | 3/2021 | Freitag et al. | |
| 12,354,627 B2 * | 7/2025 | Le ........................... | G11B 5/235 |

* cited by examiner

*Primary Examiner* — Nabil Z Hindi
(74) *Attorney, Agent, or Firm* — DLA Piper LLP (US)

(57) ABSTRACT

The present embodiments relate to a pre-assisted microwave assisted magnetic recording (PA-MAMR) write head that utilizes spin-Hall nano-oscillators (SHNOs). The SHNO can include a free layer and a spin-hall layer comprising a spin-hall material(s). The SHNO(s) can be disposed in a leading shield (LS) region and can be used to pump energy into the media before the writing process. A spin-torque oscillator (STO) utilized in other write head designs can be replaced with SHNOs, which can pre-excite the media and let the media oscillation damp over time and then switch under the writer field.

20 Claims, 8 Drawing Sheets

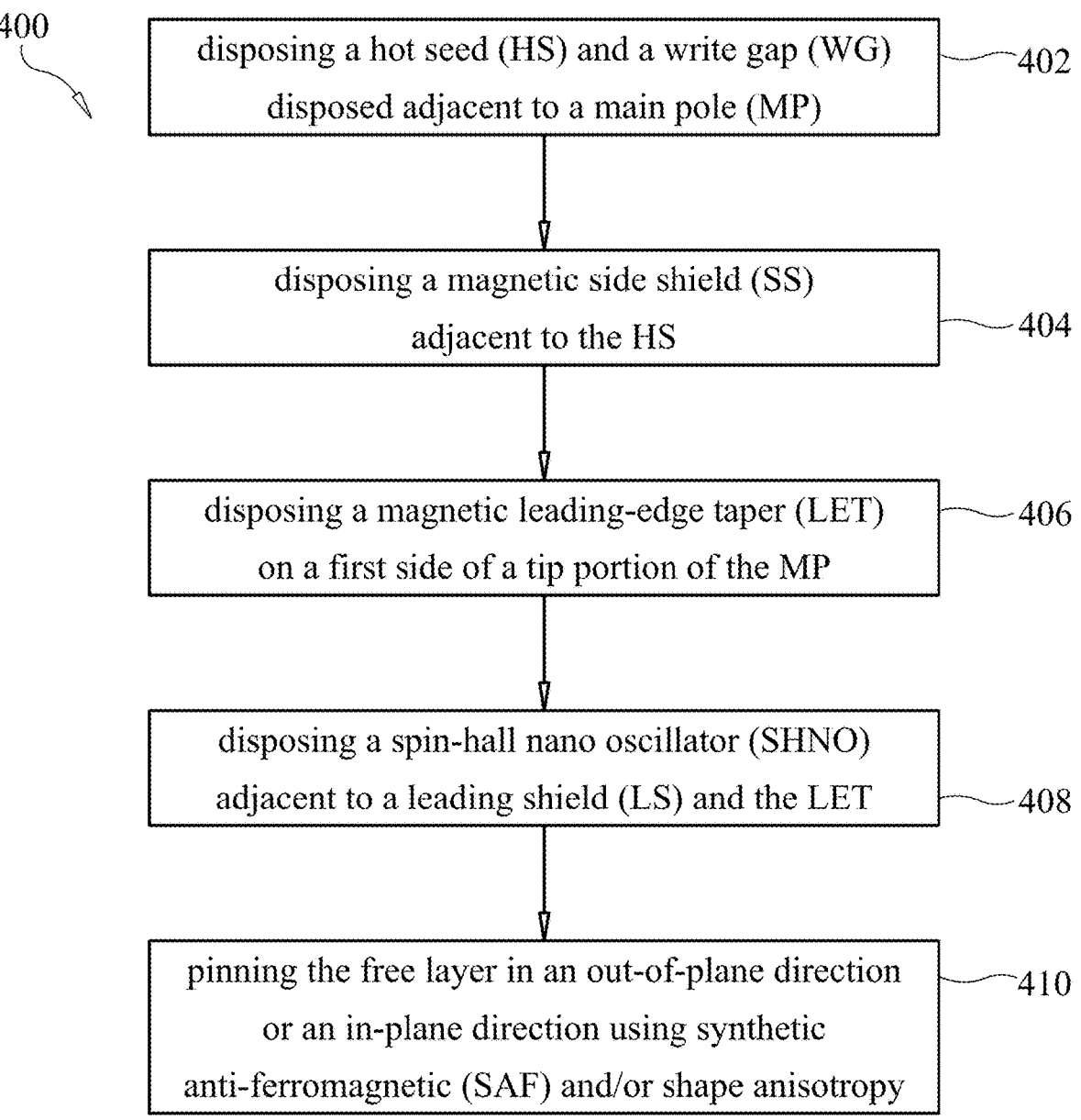

400 disposing a hot seed (HS) and a write gap (WG) disposed adjacent to a main pole (MP) ~402 disposing a magnetic side shield (SS) adjacent to the HS ~404 disposing a magnetic leading-edge taper (LET) on a first side of a tip portion of the MP ~406 disposing a spin-hall nano oscillator (SHNO) adjacent to a leading shield (LS) and the LET ~408 pinning the free layer in an out-of-plane direction or an in-plane direction using synthetic anti-ferromagnetic (SAF) and/or shape anisotropy ~410

FIG. 4

PRE-ASSISTING MICROWAVE MAGNETIC RECORDING BASED ON SPIN-HALL NANO-OSCILLATORS

TECHNICAL FIELD

Embodiments of the invention relate to the field of electro-mechanical data storage devices. More particularly, embodiments of the invention relate to a pre-assisted microwave assisted magnetic recording (PA-MAMR) write head utilizing spin-hall nano-oscillators.

BACKGROUND

A magnetic recording medium (e.g., a magnetic disk) can store magnetic bits representing digital data. A magneto-resistive reader can be part of a hard disk drive (HDD) to read a state of the magnetic bits and read the digital data stored on the disk.

In many write head designs, microwave assisted magnetic recording (MAMR) designs can be utilized. MAMR can use microwave to excite the ferromagnetic resonance (FMR) of media, which can reduce its effective uniaxial anisotropy $(H_k)$. By reducing the effective anisotropy, the switching field can be consequently reduced. Once the media is moved away from the microwave source, the media can go back to its high anisotropy state to maintain sufficient thermal decay.

Many MAMR designs can be categorized into two groups, the first being flux-controlled MAMR (FC-MAMR) designs and the other being microwave-assisted MAMR (MAS-MAMR). A feature in MAS-MAMR devices is that they may contain a spin-torque-oscillator (STO) in the WG. The STO can include a pinned layer, which served as a spin polarizer, and a free layer, which can oscillate after sense the spin transfer torque via the spin polarized current from the pinned layer. However, the WG may only be able to fit a small amount of magnetic materials due to the limited gap distance, which can constrain the strength of the generated AC magnetic field. Further, STO devices can use an additional pinned layer and space layer, which can further reduce the available space for the free layer.

SUMMARY

The present embodiments relate to a pre-assisted microwave assisted magnetic recording (PA-MAMR) write head that utilizes spin-Hall nano-oscillators (SHNOs). The SHNO can include a free layer and a spin-hall layer comprising a spin-hall material(s). The SHNO(s) can be disposed in a leading shield (LS) region and can be used to pump energy into the media before the writing process. A spin-torque oscillator (STO) utilized in other write head designs can be replaced with SHNOs, which can pre-excite the media and let the media oscillation damp over time and then switch under the writer field.

In a first example embodiment, a pre-assist microwave-assisted magnetic recording (PA-MAMR) write head is provided. The PA-MAMR write head can include a magnetic main pole (MP) comprising a tip portion. The PA-MAMR write head can also include a hot seed (HS) and a write gap (WG) disposed adjacent to the MP and configured to collect a magnetic flux from the MP.

The PA-MAMR write head can also include a magnetic leading-edge taper (LET) disposed on a first side of the tip portion of the MP and creating a taper in the first side of the tip portion of the MP. The PA-MAMR write head can also include a spin-hall nano oscillator (SHNO) disposed adjacent to a leading shield (LS) and the LET. The SHNO can include a free layer and a spin-hall layer.

In some instances, the PA-MAMR write head can also include a magnetic side shield (SS) disposed adjacent to the HS and configured to confine the magnetic flux in a cross-track direction.

In some instances, a center portion of the LET comprises an insulator to define a current path for the SHNO.

In some instances, the free layer comprises a magnetic material including any of a Cobalt-Platinum (Co/Pt) multi-layer, a Cobalt-Palladium (Co/Pd) multilayer, or a Cobalt-Iron-Boron (CoFeB)/Magnesium Oxide (MgO) multilayer, such that the free layer is capable of exhibiting a circular oscillation mode.

In some instances, the spin-hall layer comprises a magnetic material including any of an Iron-Platinum alloy (FePt), a manganese-tin alloy $(Mn_3Sn)$, and an Iridium-Manganese alloy $(IrMn_3)$, such that the spin-hall layer is configured to generate an out-of-plane polarized spin current.

In some instances, the spin-hall layer comprises a perpendicular/in-plane coupled ferromagnetic trilayer comprising multiple stacked ferromagnetic layers or a Cobalt-Gadolinium (Co/Gd) multilayer.

In some instances, the free layer is configured to have an in-plane configuration by comprising a magnetic material that includes a Nickel-Iron (NiFe) alloy or an Iron-Cobalt (FeCo) alloy that is capable of exhibiting either an elliptical oscillation mode or a circular oscillation mode.

In some instances, the spin-hall layer is configured to exhibit in-plane spin-polarized spin current with a spin-hall angle by comprising a material including any of Platinum (Pt), Gold (Au), Tantalum (Ta), Tungsten (W), a Gold-Platinum (AuPt) alloy, an Iron-Silicon (FeSi) alloy, or a topological spin-Hall material including any of Tungsten ditelluride $(WTe_2)$, molybdenum ditelluride $(MoTe_2)$, or a niobium arsenide (NbAs).

In some instances, the free layer is pinned in an out-of-plane direction or an in-plane direction using synthetic anti-ferromagnetic (SAF) and/or shape anisotropy.

In some instances, a thickness of free layer ranges from 5 nanometers (nm) to 20 nm, and wherein a width of free layer ranges from 30 nm to 400 nm, and wherein a height of free layer ranges from 20 nm to 400 nm.

In some instances, the SHNO comprises the spin-hall layer comprising a negative magnetization is disposed on top of the free layer such that the spin-hall layer is disposed adjacent to the LET, and wherein the free layer is disposed on top of a second spin-hall layer comprising a positive magnetization.

In some instances, the SHNO comprises the spin-hall layer comprising a positive magnetization disposed on top of the free layer such that the spin-hall layer is disposed adjacent to the LET, and wherein the free layer is disposed on top of a second spin-hall layer comprising a negative magnetization.

In some instances, the PA-MAMR write head is part of a recording device in a head arm assembly, wherein the recording device is connected to a slider and a load beam, wherein the load beam is connected to a suspension configured to support the recording device and the slider.

In another example embodiment, a head arm assembly is provided. The head arm assembly can include a recording head with a slider and a device connected to the slider. The device can include a main pole (MP). The device can also include a magnetic leading-edge taper (LET) disposed on a first side of a tip portion of the MP and configured to create a taper in the first side of the MP. The device can also include a spin-hall nano oscillator (SHNO) disposed adjacent to a leading shield (LS) and the LET. The SHNO can include a free layer and a spin-hall layer.

In some instances, the device further includes a hot seed (HS) and a write gap (WG) disposed adjacent to the MP and configured to collect a magnetic flux from the MP, a magnetic side shield disposed adjacent to the HS and configured to confine the magnetic flux in a cross-track direction, and an insulator at a center portion of the LET to define a current path for the SHNO.

In some instances, the SHNO comprises the spin-hall layer comprising a negative magnetization disposed on top of the free layer such that the spin-hall layer is disposed adjacent to the LET.

In some instances, the free layer is disposed on top of a second spin-hall layer comprising a positive magnetization such that the free layer is disposed adjacent to the LET.

In another example embodiment, a method for manufacturing a pre-assist microwave-assisted magnetic recording (PA-MAMR) write head is provided. The method can include disposing a hot seed (HS) and a write gap (WG) disposed adjacent to a main pole (MP). The HS and the WG can be configured to collect a magnetic flux from the MP.

The method can also include disposing a magnetic side shield (SS) adjacent to the HS. The SS can be configured to confine the magnetic flux in a cross-track direction.

The method can also include disposing a magnetic leading-edge taper (LET) on a first side of a tip portion of the MP. The LET can create a taper in the first side of the MP. In some instances, an insulator can be added to a center portion of the LET to define a current path for the SHNO.

The method can also include disposing a spin-hall nano oscillator (SHNO) adjacent to a leading shield (LS) and the LET. The SHNO can include a free layer and a spin-hall layer. In some instances, the method can include disposing the free layer on top of the spin-hall layer comprising a positive magnetization. The method can also include disposing a second spin-hall layer comprising a negative magnetization on top of the free layer such that the second spin-hall layer is disposed adjacent to the LET.

In some instances, the method can include pinning the free layer in an out-of-plane direction or an in-plane direction using synthetic anti-ferromagnetic (SAF) and/or shape anisotropy.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIG. 4 is an example flow process for a method for manufacturing a pre-assist microwave-assisted magnetic recording (PA-MAMR) write head in accordance with some embodiments.

DETAILED DESCRIPTION

Figure 1A:
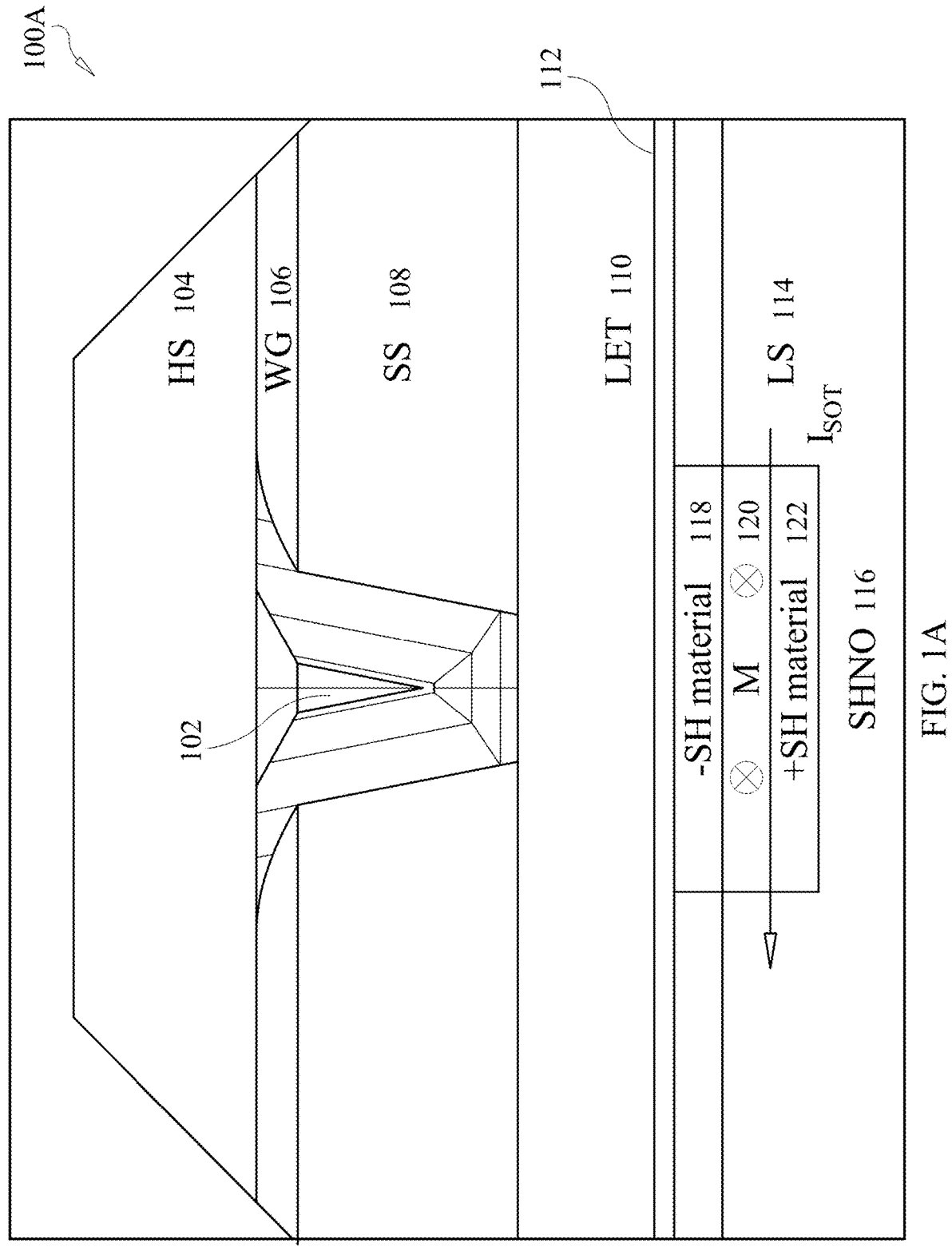
FIG. 1A is an example air-bearing surface (ABS) view of a SHNO PA-MAMR design in accordance with some embodiments.

A hard disk drive (HDD) can include a magneto-resistive (MR) reader to read a state of the magnetic bits stored on the disk. Various techniques can be implemented by the magneto-resistive reader to read the magnetic bits on the disk, such as tunnel magnetoresistance (TMR) of magnetic tunnel junctions (MTJ), for example. These techniques can implement a sense layer with magnetization rotating under the influence of a magnetic field directed from the magnetic recording medium and a reference layer of fixed magnetization.

To achieve higher area density capability (ADC), the write head was initially designed with record longitudinal (LMR) designs and then migrated to perpendicular magnetic recording (PMR) designs. More recently, implementing any of a trailing shield (TS), leading shield (LS), and side shield (SS) can provide improved down-track and cross-track gradients, which can assist in achieving a higher track per inch (TPI) and bit per inch (BPI).

Further, as writers demand an increase of TPI, the size of MP may need to be further shrunk down, along with the media grain size. However, due to the shrinkage of the MP size and smaller writer gap (WG) and side gap (SG), the writability of the write head can become weaker so that the writer may not be capable of writing the media with certain thermal stability without losing signal-to-noise ratio (SNR). This can be referred to as the trilemma in media that limits the further improvement of any PMR writer heads.

To overcome this issue, microwave assisted magnetic recording (MAMR) designs can be utilized. MAMR can use microwave to excite the ferromagnetic resonance (FMR) of media, which can reduce its effective uniaxial anisotropy ($H_k$). By reducing the effective anisotropy, the switching field can be consequently reduced. Once the media is moved away from the microwave source, the media can go back to its high anisotropy state to maintain sufficient thermal decay. This can effectively solve the trilemma that writer heads are facing.

Many MAMR designs can be categorized into two groups, the first being flux-controlled MAMR (FC-MAMR) designs and the other being microwave-assisted MAMR (MAS-MAMR). A feature in MAS-MAMR devices is that they contain a spin-torque-oscillator (STO) in the WG. The STO can include a pinned layer, which served as a spin polarizer, and a free layer, which can oscillate after sense the spin transfer torque via the spin polarized current from the pinned layer. However, the WG can only fit a small amount of magnetic materials due to the limited gap distance, which can constrain the strength of the generated AC magnetic field. Further, STO devices can use an additional pinned layer and space layer, which can further reduce the available space for the free layer.

To overcome these issues, a pre-assisted MAMR (PA-MAMR) design based on spin-Hall nano-oscillators (SHNOs) can be implemented. In the designs as described herein, SHNOs can be disposed in the LS region and can be used to pump energy into the media before the writing process. In comparison to other designs, the STO can be replaced with SHNOs and placed in the leading shield (LS), which can pre-excite the media and let the media oscillation damp over the time and then switch under the writer field.

In the present embodiments, a design for pre-assist MAMR (PA-MAMR) write head can include a magnetic main pole (MP) that provides a strong and concentrated field to write the medium bits. The write head can also include a magnetic trailing shield (TS) which is composed of hot seed (HS) and write shield (WG) to collect flux from MP and increase a downtrack gradient. The write head can also include two magnetic side shields (SS) to confine the flux in crosstrack direction that can increase a crosstrack gradient.

The write head can also include a magnetic leading-edge taper (LET) to create ta aper in a leading side of the MP and a magnetic leading shield (LS) that is used to constrain flux and accommodate spin torque devices. The write head can also include spin torque oscillators (SHNOs) that are deposited and patterned in the LS region. The write head can also include conductive materials in write gap (WG) and a leading gap (LG) that allows the current to flow through. The write head can also include insulation layers that can be used to guide and concentrate bias current.

The center region of the LET can be refilled with non-magnetic and wrapped with insulators to define a current path for SHNOs. Further, the free layer of the SHNOs deposited in LS region can be designed to have out-of-plane easy axis by depositing PMA magnetic materials, including but not limited to Co/Pt multilayers, Co/Pd multilayers, CoFeB/MgO multilayers, etc. This type of free layer can exhibit circular oscillation mode (e.g., see FIG. 3A).

The spin-Hall materials adjacent to the PMA magnetic materials can include a type of spin-Hall material that exhibits out-of-plane or partially out-of-plane spin-polarized spin current, which can include FePt, $Mn_3Sn$, $IrMn_3$, etc. Some multilayers may also generate this type of out-of-plane polarized spin current, such as perpendicular/in-plane coupled ferromagnetic trilayer system and Co/Gd multilayers.

The free layer of the SHNOs deposited in the LS region can be designed to have in-plane easy plane by depositing conventional magnetic thin film materials, including but not limited to NiFe alloys, FeCo alloys, etc. This type of spin-Hall device can exhibit elliptical oscillation mode or circular oscillation modes, depending on the bias current and easy axis of the free layer (e.g., see FIG. 3B). This design can be used to generate linear RF signals in elliptical oscillation modes.

The spin-Hall materials adjacent to the in-plane magnetic materials can include a type of spin-Hall materials that exhibit in-plane spin-polarized spin current with large spin-Hall angle, which can include heavy metals such as Pt, Au, Ta, W, AuPt alloy, FeSi alloy, etc., or topological spin-Hall materials such as $WTe_2$, $MoTe_2$, NbAs, etc.

The magnetic magnetization of free layer can be either pinned at out-of-plane direction or in-plane direction, via synthetic anti-ferromagnetic (SAF) and shape anisotropy. Further, the thickness of a free layer can range from 5 to 20 nm. The width of the free layer can range from 30 to 400 nm. The height of the free layer can range from 20 nm to 400 nm.

The SHNOs in the LS region can be extended to LET region if necessary. Offsets with respective to the center track can be applicable to reduce the impact from the skew angles.

Figure 1B:
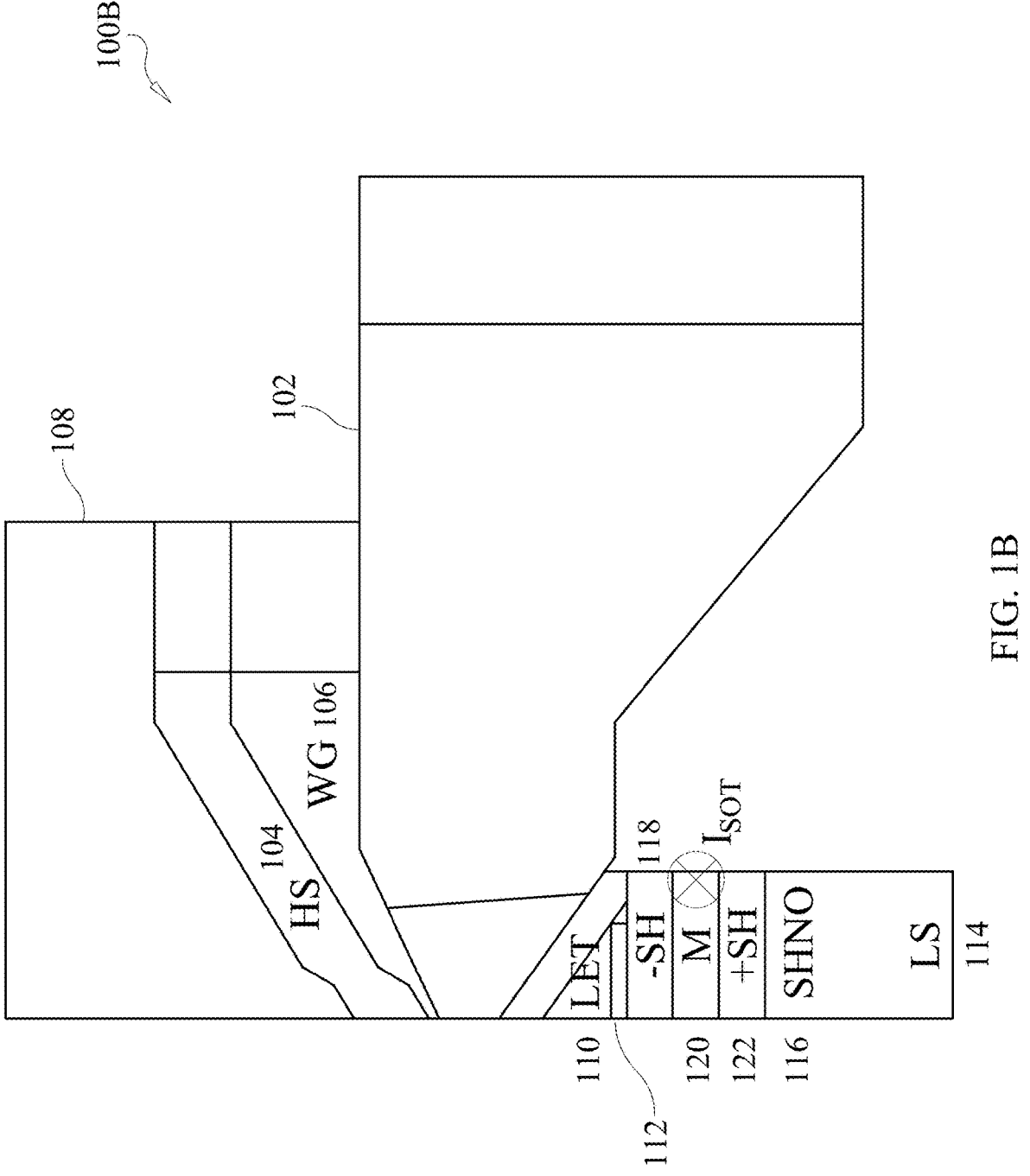
FIG. 1B is an example cross-section view of the SHNO PA-MAMR design in accordance with some embodiments.

In comparison to FC/MAS-MAMR designs, an important feature of the PA-MAMR can be to move the nano-oscillator from the WG to the LS region and replace the STO with SHNO. FIG. 1A is an example air-bearing surface (ABS) view of a SHNO PA-MAMR design. FIG. 1B is an example cross-section view of the SHNO PA-MAMR design.

As shown in FIGS. 1A-1B, device 100A, 100B can have a SHNO 116 that replaces a STO that is disposed near the LS region 114. Further, as shown in FIG. 1A, a main pole (MP) 102 can be disposed adjacent to a write gap (WG) 106 and a hot seed (HS) layer 104. A side shield (SS) 108 can be disposed adjacent to the HS layer 104. Further, a leading-edge taper (LET) 110 can be disposed between the MP 102 and the SHNO 116. A dielectric layer 112 can be disposed to control the electrical current between the MP 102, the LET 110, and the SHNO 116.

The SHNO 116 can include multiple layers in a stack. For instance, the SHNO can include a free layer (M) 120 disposed between spin-hall (SH) layers –SH layer 118 and +SH layer 122. Once the free layer (M) 120 is design to always point to an out-of-ABS direction and bias current is applied from right to left, a negative signed spin-Hall materials (–SH layer 118) can be deposited on top of the M layer such that the –SH layer 118 is disposed closer to the LET 110 or MP 102 than the M layer 120.

In some instances, the +SH layer (e.g., +SH layer 122) can be deposited above the M layer 120. In other embodiments, the M layer 120 can be disposed on top of the –SH layer 118.

In MAS-MAMR, the low frequency magnetic field generated from the MP and the high frequency magnetic field generated from the STO can be simultaneously applied to the media during the writing process. In contrast, the mechanism of SHNO PA-MAMR can have two distinctive features compared to MAS-MAMR. First, instead of using spin-transfer-torque to excite oscillation state in STO, the SHNO can utilize spin-Hall effect to create a spin-orbit torque from heavy metals without an additional spin polarizer layer. Similar to spin-transfer torque, the spin-orbit torque converted from the spin-Hall effect can contain an anti-damping-like torque, which can reduce the intrinsic damping of the system and drive the free layer into the auto-oscillation state. The SHNO can be placed in the LS region, as is shown in FIG. 2, for example.

Figure 2:
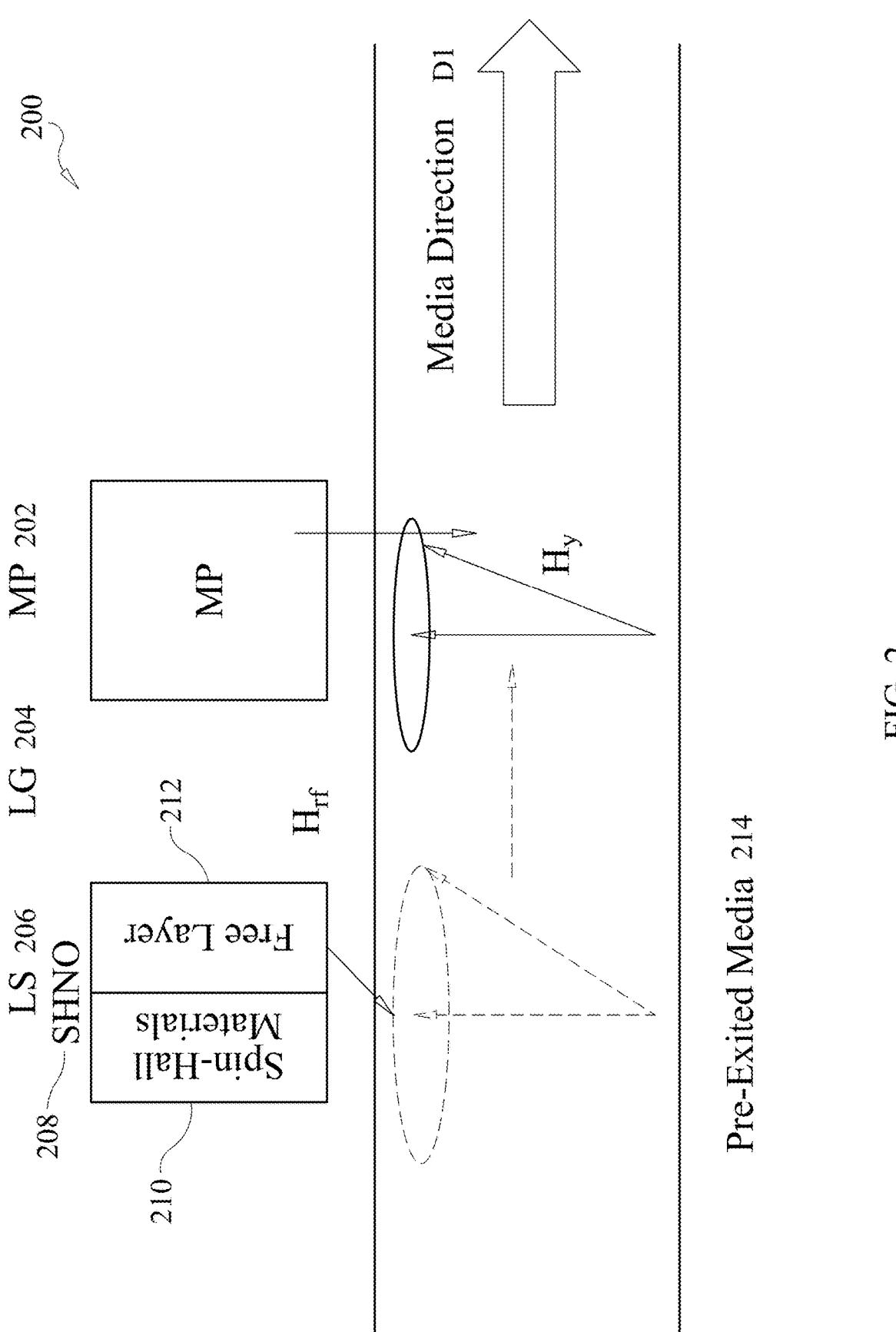
FIG. 2 illustrates an example mechanism of SHNOs in a PA-MAMR head in accordance with some embodiments.

FIG. 2 illustrates an example mechanism of SHNOs in a PA-MAMR head 200. As shown in FIG. 2, The MP 202 and the SHNO 208 can interact with media (e.g., pre-exited media 214 to generate magnetic fields relative to the media direction D1. The SHNO 208 can be disposed adjacent to the LS 206, with a LG 204 between the MP 202 and the SHNO 208. The SHNO 208 can include Spin-Hall material layer(s) 210 and a free layer 212.

The media-bit pre-excited by $H_{rf}$ generated from the SHNOs can spin underneath the MP before its magnetization is switched by the MP magnetic field. The SHNOs in the LS region can pre-excite the media, and the pre-excited media can quickly move (usually within 0.5-5 ns) under the MP with the disk spinning. Once the pre-excited media reached the MP region, it can be switched by the MP writing field.

Several advantages can be found in SHNO PA-MAMR, such as easy dry film deposition and fabrication that can remove any need to deposit magnetic multilayers and GMR devices. The write head design can also remove the need to have pinned polarization layer and save space, and the need to fabricate STO/SHNO on a tapered surface. The designs can make it easier to increase the magnetic volume and saturation magnetization of the rf field generation layer. Magnetic field from MP can be weak and shielded by part of LS, which can have a lower impact from MP switching. The designs can have a higher oscillation frequency due to in-plane magnetization configuration. The designs as described herein can be compatible with many write head designs.

Figure 3A:
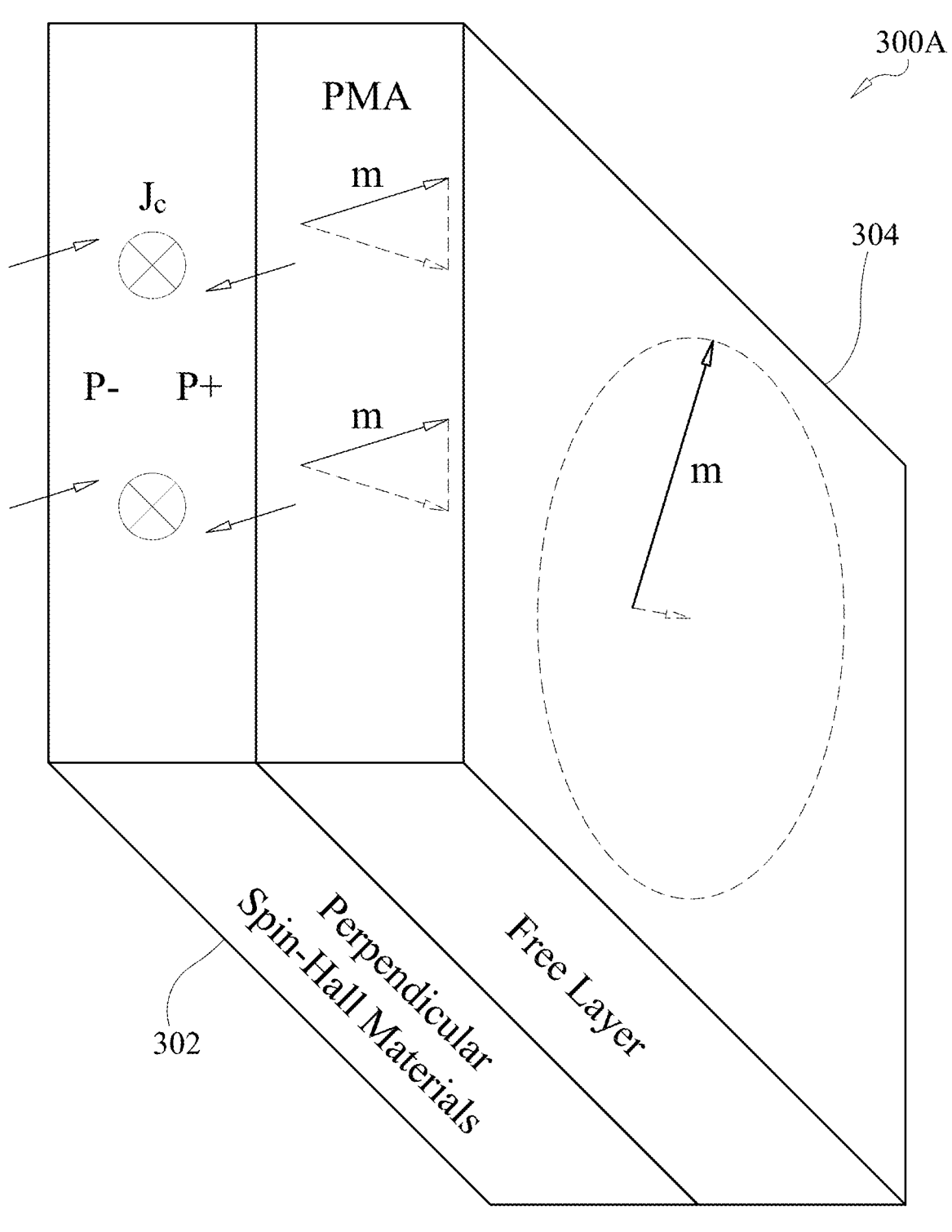
FIG. 3A is an example SHNO PA-MAMR configuration with an out-of-plane SHNO in accordance with some embodiments.

A feature in the present designs to take advantage of the performance benefits described herein can be to generate a proper alternating current (AC) field from the SHNO. There can be two main configurations for the SHNO PA-MAMR, which can be distinguished by the free layer magnetization direction. For the first type, similar to MAS-MAMR, the magnetization of free layer can be perpendicular to the thin film plane, as seen in FIG. 3A, for example. Depending on the spin-Hall materials used in the stack, the charge current flowing in the spin-Hall materials can convert to spin current, with either an in-plane spin polarization orthogonal to the magnetization direction or out-of-plane spin polarization. At the right spin polarization, the spin current can exert an anti-damping-like torque to the magnetic moments and drive them into the auto-oscillation mode. In this scenario, the auto-oscillation moments can precess in-plane or out-of-plane in circle with certain chirality.

Figure 3B:
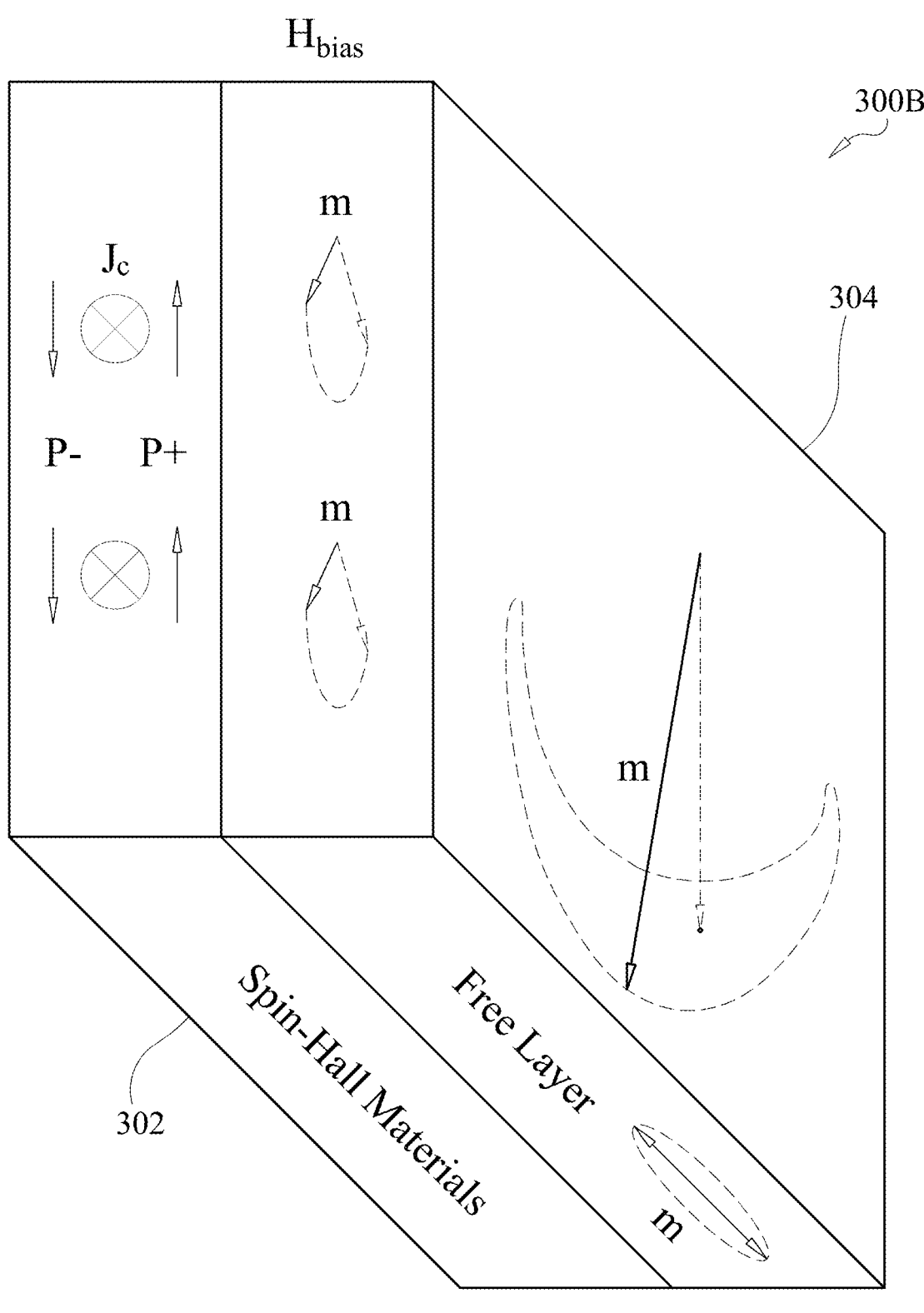
FIG. 3B is an example SHNO PA-MAMR configuration with an in-plane SHNO in accordance with some embodiments.

FIG. 3A is an example SHNO PA-MAMR configuration with an out-of-plane SHNO. FIG. 3B is an example SHNO PA-MAMR configuration with an in-plane SHNO. In any of FIGS. 3A-3B, the SHNO PA-MAMR device 300A, 300B can include a perpendicular spin-hall material layer 302 and a free layer 304.

In MAS-MAMR, due to the strong gap field in WG, the free layer (FL) magnetization of the STO can be perpendicular to the film plane as it is aligned to the gap field and precesses in circle with a specific chirality. Compared to MAS-MAMR, since the magnetic field in LS can be much weaker than that in the WG, the FL of SHNO in PA-MAMR can be less impacted by the external field and the moment can precess either in-plane or out-of-plane with an ellipse trajectory as shown in FIGS. 3A-3B. The orientation of the magnetization can be defined by either pinned layer or shape anisotropy.

The frequency of the oscillation can also be greatly increased by moving the SHNO from WG to LS. According to the Kittle equation, since the magnetization is oscillating out-of-plane in MAS-MAMR the ferromagnetic resonance frequency (FMR) in MAS-MAMR can equal to $f=\gamma/2\pi(B-\mu_0 M_{eff})$, where $\gamma$ is gyromagnetic ratio, B is magnetic flux, $\mu_0$ is vacuum permeability, and $M_{eff}$ is the effective magnetization.

Contrarily, in PA-MAMR, magnetization can be resonating in-plane, which gives $f=\gamma/2\pi(B(B+\mu_0 M_{eff}))^{0.5}$. This can mean that PA-MAMR can achieve much higher frequency at the same external field since the demagnetization field originated from the thin film is helping to increase the resonance frequency. This high frequency oscillation (20-50 GHZ) can be preferable for MAMR application as it can match the oscillation frequency of the media bit. In addition, the oscillation can generate a linear RF field, which can make the assist insensitive to the chirality of the media's precession.

In many cases, the PA-MAMR design can be integrated with other write head designs, since most of these technologies can only require the bias current passing through the WG. By creating another current path to LS, STOs can be easily excited into oscillation states without losing other assists from the WG.

The present embodiments can use a writer structure as shown in FIGS. 1A-1B, with SHNO device placed in the LS region, below the center of MP. Insulation layers can be used to guide the current direction.

In a first example, as is shown in FIG. 1A, once the free layer (M) is defined to always point to an out-of-ABS direction and bias current is applied from right to left, the free layer can be deposited on top of a positive signed spin-Hall materials (+SH) like Pt. In a second example, as is shown in FIG. 1A, once the free layer (M) is defined to always point to an out-of-ABS direction and bias current is applied from right to left, a negative signed spin-Hall materials (−SH) like Ta can be deposited on top of the free layer. In a third example, as is shown in FIG. 1A, once the free layer (M) is defined to always point to an out-of-ABS direction and bias current is applied from right to left, the M can be sandwiched with two opposite signed spin-Hall materials, with order of materials stack +SH/M/−SH from the bottom to top layer.

In a fourth example, opposite to the first example, whether we change the direction of M or the direction of bias current by 180 degrees, the +SH materials can be deposited on top of M. In a fifth example, opposite to the second embodiment, changing the direction of M or the direction of bias current by 180 degrees can result in the free layer being deposited on top of −SH materials. In a sixth example, opposite to the third example, the change the direction of M or the direction of bias current by 180 degree, the stack order can be −SH/M/+SH from the bottom layer to the top layer.

FIG. 4 is an example flow process 400 for a method for manufacturing a pre-assist microwave-assisted magnetic recording (PA-MAMR) write head. At 402, the method can include disposing a hot seed (HS) (e.g., HS layer 104 in FIG. 1A) and a write gap (WG) (e.g., WG 106 in FIG. 1A) disposed adjacent to a main pole (MP) (e.g., MP 102 in FIG. 1A). The HS and the WG can be configured to collect a magnetic flux from the MP.

At 404, the method can include disposing a magnetic side shield (SS) (e.g., SS 108 in FIG. 1A) adjacent to the HS. The SS can be configured to confine the magnetic flux in a cross-track direction.

At 406, the method can include disposing a magnetic leading-edge taper (LET) (e.g., LET 110 in FIG. 1A) on a first side of a tip portion of the MP. The LET can create a taper in the first side of the MP. In some instances, an insulator can be added to a center portion of the LET to define a current path for the SHNO.

At 408, the method can include disposing a spin-hall nano oscillator (SHNO) (e.g., SHNO 116 in FIG. 1A) adjacent to a leading shield (LS) and the LET. The SHNO can include a free layer and a spin-hall layer. In some instances, the method can include disposing the free layer (e.g., M layer 120 in FIG. 1B) on top of the spin-hall layer comprising a positive magnetization (e.g., +SH layer 122 in FIG. 1B). The method can also include disposing a second spin-hall layer comprising a negative magnetization (e.g., −SH layer 118 in FIG. 1B) on top of the free layer such that the second spin-hall layer is disposed adjacent to the LET. Any of the layers can be disposed via various techniques, such as ion-beam etching, chemical vapor deposition (CVD), atomic layer deposition, etc.

In some instances, at 410, the method can include pinning the free layer in an out-of-plane direction or an in-plane direction using synthetic anti-ferromagnetic (SAF) and/or shape anisotropy.

Figure 5:
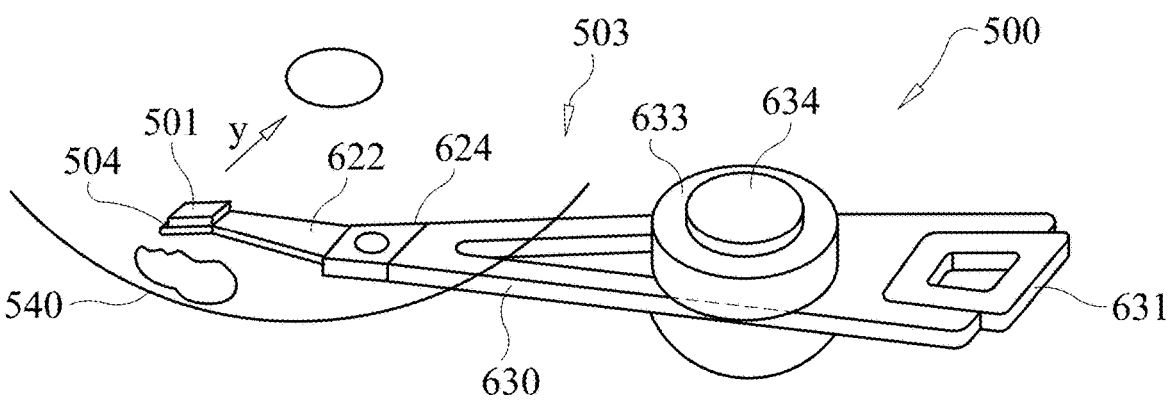
FIG. 5 is a perspective view of an example head arm assembly, according to some embodiments.
Figure 6:
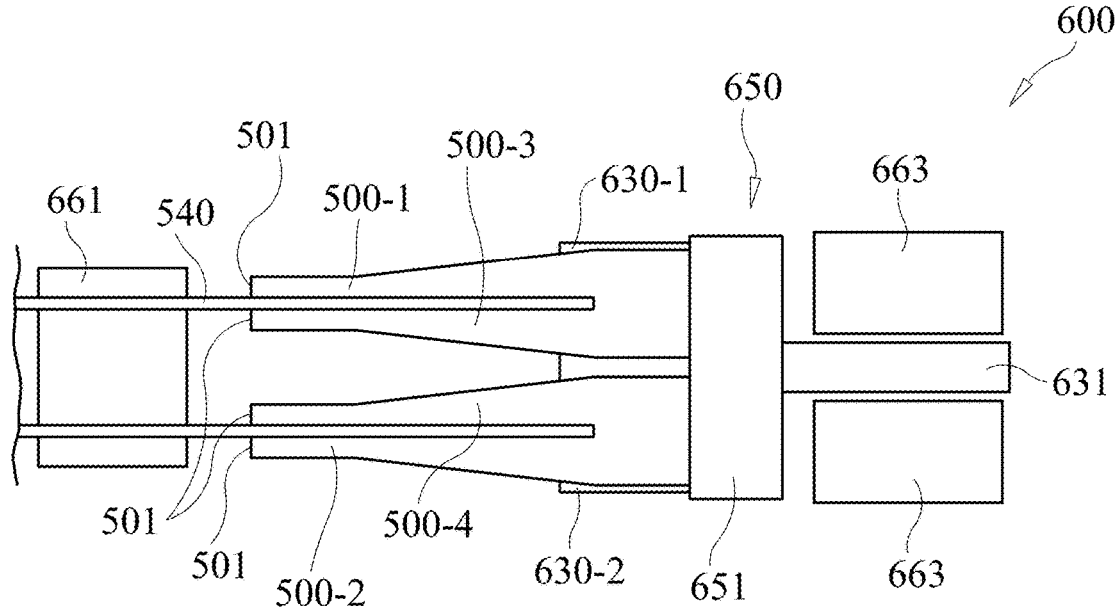
FIG. 6 is a side view of an example head stack assembly, according to some embodiments.

The head as described herein can be part of a hard disk drive (HDD) system. For instance, the head can include a slider and a write structure as described herein, with a suspension configured to support the head. FIG. 5 is a perspective view of an example head arm assembly 500, according to some embodiments of the present disclosure. The head and LD as described herein can be part of an assembly comprising components as described with respect to FIGS. 5-7.

Referring to FIG. 5, a head arm assembly (or Head Gimbal Assembly (HGA)) 500 includes a magnetic recording head 501 comprised of a slider and a writer structure formed thereon, and a suspension 503 that elastically supports the magnetic recording head. The suspension has a plate spring-like load beam 622 formed with stainless steel, a flexure 504 provided at one end portion of the load beam, and a base plate 624 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 500 is mounted on an arm 630 formed in the head arm assembly. The arm moves the magnetic recording head 501 in the cross-track direction y of the magnetic recording medium 540. One end of the arm is mounted on base plate 624. A coil 631 that is a portion of a voice coil motor is mounted on the other end of the arm. A bearing part 633 is provided in the intermediate portion of arm 630. The arm is rotatably supported using a shaft 634 mounted to the bearing part 633. The arm 630 and the voice coil motor that drives the arm configure an actuator.

Next, a side view 600 of a head stack assembly (FIG. 6) and a plan view 700 of a magnetic recording apparatus (FIG. 7) wherein the magnetic recording head 501 is incorporated are depicted. The head stack assembly 650 is a member to which a plurality of HGAs (HGA 500-1 and second HGA 500-2 are at outer positions while HGA 500-3 and HGA 500-4 are at inner positions) is mounted to arms 630-1, 630-2, respectively, on carriage 651. A HGA is mounted on each arm at intervals so as to be aligned in the perpendicular direction (orthogonal to magnetic medium 540). The coil portion (631 in FIG. 5) of the voice coil motor is mounted at the opposite side of each arm in carriage 651. The voice coil motor has a permanent magnet 663 arranged at an opposite position across the coil 631.

Figure 7:
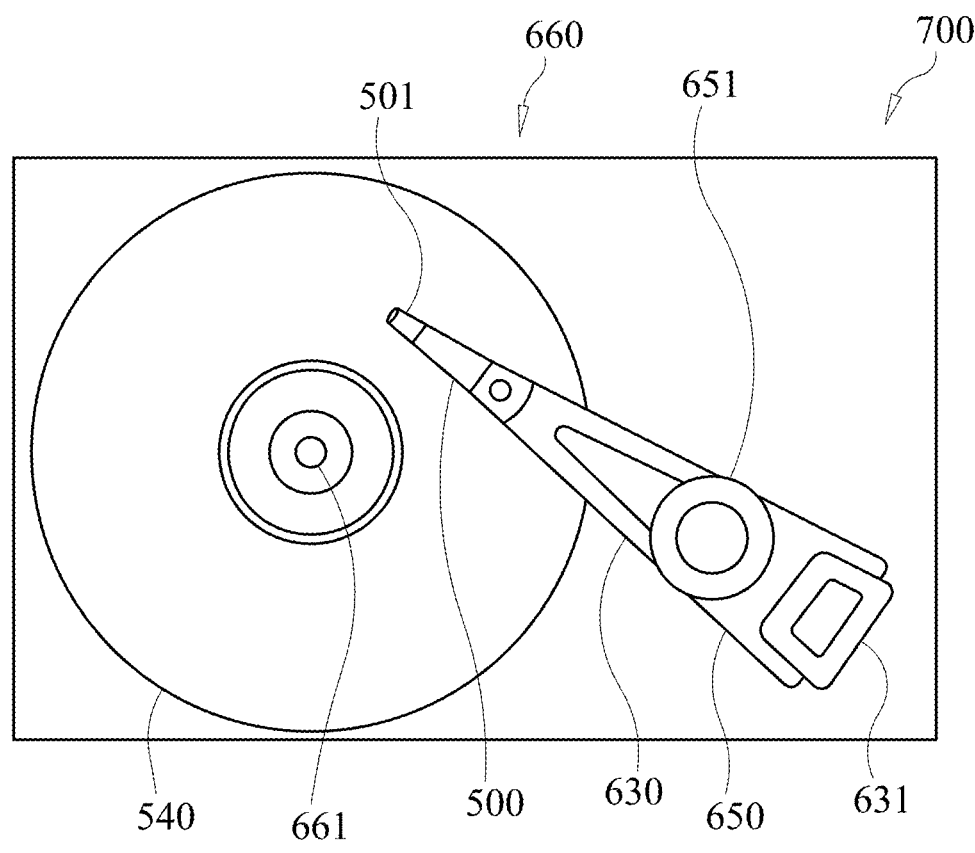
FIG. 7 is a plan view of an example magnetic recording apparatus, according to some embodiments.

With reference to FIG. 7, the head stack assembly 650 is incorporated in a magnetic recording apparatus 660. The magnetic recording apparatus has a plurality of magnetic media 540 mounted to spindle motor 661. For every magnetic recording medium, there are two magnetic recording heads arranged opposite one another across the magnetic recording medium. The head stack assembly and actuator except for the magnetic recording heads 501 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a writer element (not shown) and reproduces the information recorded in the magnetic recording media by a magneto-resistive (MR) sensor element (not shown).

In a first example embodiment, a pre-assist microwave-assisted magnetic recording (PA-MAMR) write head is provided. The PA-MAMR write head can include a magnetic main pole (MP) comprising a tip portion. The PA-MAMR write head can also include a hot seed (HS) and a write gap (WG) disposed adjacent to the MP and configured to collect a magnetic flux from the MP.

The PA-MAMR write head can also include a magnetic leading-edge taper (LET) disposed on a first side of the tip portion of the MP and creating a taper in the first side of the tip portion of the MP. The PA-MAMR write head can also include a spin-hall nano oscillator (SHNO) disposed adjacent to a leading shield (LS) and the LET. The SHNO can include a free layer and a spin-hall layer.

In some instances, the PA-MAMR write head can also include a magnetic side shield (SS) disposed adjacent to the HS and configured to confine the magnetic flux in a cross-track direction.

In some instances, a center portion of the LET comprises an insulator to define a current path for the SHNO.

In some instances, the free layer comprises a magnetic material including any of a Cobalt-Platinum (Co/Pt) multilayer, a Cobalt-Palladium (Co/Pd) multilayer, or a Cobalt-Iron-Boron (CoFeB)/Magnesium Oxide (MgO) multilayer, such that the free layer is capable of exhibiting a circular oscillation mode.

In some instances, the spin-hall layer comprises a magnetic material including any of an Iron-Platinum alloy (FePt), a manganese-tin alloy ($Mn_3Sn$), and an Iridium-Manganese alloy ($IrMn_3$), such that the spin-hall layer is configured to generate an out-of-plane polarized spin current.

In some instances, the spin-hall layer comprises a perpendicular/in-plane coupled ferromagnetic trilayer comprising multiple stacked ferromagnetic layers or a Cobalt-Gadolinium (Co/Gd) multilayer.

In some instances, the free layer is configured to have an in-plane configuration by comprising a magnetic material that includes a Nickel-Iron (NiFe) alloy or a Iron-Cobalt (FeCo) alloy that is capable of exhibiting either an elliptical oscillation mode or a circular oscillation mode.

In some instances, the spin-hall layer is configured to exhibit in-plane spin-polarized spin current with a spin-hall angle by comprising a material including any of Platinum (Pt), Gold (Au), Tantalum (Ta), Tungsten (W), a Gold-Platinum (AuPt) alloy, an Iron-Silicon (FeSi) alloy, or a topological spin-Hall material including any of Tungsten ditelluride ($WTe_2$), molybdenum ditelluride ($MoTe_2$), or a niobium arsenide (NbAs).

In some instances, the free layer is pinned in an out-of-plane direction or an in-plane direction using synthetic anti-ferromagnetic (SAF) and/or shape anisotropy.

In some instances, a thickness of free layer ranges from 5 nanometers (nm) to 20 nm, and wherein a width of free layer ranges from 30 nm to 400 nm, and wherein a height of free layer ranges from 20 nm to 400 nm.

In some instances, the SHNO comprises the spin-hall layer comprising a negative magnetization is disposed on top of the free layer such that the spin-hall layer is disposed adjacent to the LET, and wherein the free layer is disposed on top of a second spin-hall layer comprising a positive magnetization.

In some instances, the SHNO comprises the spin-hall layer comprising a positive magnetization disposed on top of the free layer such that the spin-hall layer is disposed adjacent to the LET, and wherein the free layer is disposed on top of a second spin-hall layer comprising a negative magnetization.

In another example embodiment, a write head is provided. The write head can include a main pole (MP). The write head can also include a magnetic leading-edge taper (LET) disposed on a first side of a tip portion of the MP and configured to create a taper in the first side of the MP. The write head can also include a spin-hall nano oscillator (SHNO) disposed adjacent to a leading shield (LS) and the LET. The SHNO can include a free layer and a spin-hall layer.

In some instances, the write head further includes a hot seed (HS) and a write gap (WG) disposed adjacent to the MP and configured to collect a magnetic flux from the MP, a magnetic side shield disposed adjacent to the HS and configured to confine the magnetic flux in a cross-track direction, and an insulator at a center portion of the LET to define a current path for the SHNO.

In some instances, the SHNO comprises the spin-hall layer comprising a negative magnetization disposed on top of the free layer such that the spin-hall layer is disposed adjacent to the LET.

In some instances, the free layer is disposed on top of a second spin-hall layer comprising a positive magnetization such that the free layer is disposed adjacent to the LET.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A pre-assist microwave-assisted magnetic recording (PA-MAMR) write head comprising:
   a magnetic main pole (MP) comprising a tip portion;
   a hot seed (HS) and a write gap (WG) disposed adjacent to the MP and configured to collect a magnetic flux from the MP;
   a magnetic leading-edge taper (LET) disposed on a first side of the tip portion of the MP and creating a taper in the first side of the tip portion of the MP; and
   a spin-hall nano oscillator (SHNO) disposed adjacent to a leading shield (LS) and the LET, wherein the SHNO comprises a free layer and a spin-hall layer.

2. The PA-MAMR write head of claim 1, further comprising:
   a magnetic side shield (SS) disposed adjacent to the HS and configured to confine the magnetic flux in a cross-track direction.

3. The PA-MAMR write head of claim 1, wherein a center portion of the LET comprises an insulator to define a current path for the SHNO.

4. The PA-MAMR write head of claim 1, wherein the free layer comprises a magnetic material including any of a Cobalt-Platinum (Co/Pt) multilayer, a Cobalt-Palladium (Co/Pd) multilayer, or a Cobalt-Iron-Boron (CoFeB)/Magnesium Oxide (MgO) multilayer, such that the free layer is capable of exhibiting a circular oscillation mode.

5. The PA-MAMR write head of claim 1, wherein the spin-hall layer comprises a magnetic material including any of an Iron-Platinum alloy (FePt), a manganese-tin alloy ($Mn_3Sn$), and an Iridium-Manganese alloy ($IrMn_3$), such that the spin-hall layer is configured to generate an out-of-plane polarized spin current.

6. The PA-MAMR write head of claim 1, wherein the spin-hall layer comprises a a perpendicular/in-plane coupled ferromagnetic trilayer comprising multiple stacked ferromagnetic layers or a Cobalt-Gadolinium (Co/Gd) multilayer.

7. The PA-MAMR write head of claim 1, wherein the free layer is configured to have an in-plane configuration by comprising a magnetic material that includes a Nickel-Iron (NiFe) alloy or a Iron-Cobalt (FeCo) alloy that is capable of exhibiting either an elliptical oscillation mode or a circular oscillation mode.

8. The PA-MAMR write head of claim 1, wherein the spin-hall layer is configured to exhibit in-plane spin-polarized spin current with a spin-hall angle by comprising a material including any of Platinum (Pt), Gold (Au), Tantalum (Ta), Tungsten (W), a Gold-Platinum (AuPt) alloy, an Iron-Silicon (FeSi) alloy, or a topological spin-Hall material including any of Tungsten ditelluride ($WTe_2$), molybdenum ditelluride ($MoTe_2$), or a niobium arsenide (NbAs).

9. The PA-MAMR write head of claim 1, wherein the free layer is pinned in an out-of-plane direction or an in-plane direction using synthetic anti-ferromagnetic (SAF) and/or shape anisotropy.

10. The PA-MAMR write head of claim 1, wherein a thickness of free layer ranges from 5 nanometers (nm) to 20 nm, and wherein a width of free layer ranges from 30 nm to 400 nm, and wherein a height of free layer ranges from 20 nm to 400 nm.

11. The PA-MAMR write head of claim 1, wherein the SHNO comprises the spin-hall layer comprising a negative magnetization is disposed on top of the free layer such that the spin-hall layer is disposed adjacent to the LET, and wherein the free layer is disposed on top of a second spin-hall layer comprising a positive magnetization.

12. The PA-MAMR write head of claim 1, wherein the SHNO comprises the spin-hall layer comprising a positive magnetization disposed on top of the free layer such that the spin-hall layer is disposed adjacent to the LET, and wherein the free layer is disposed on top of a second spin-hall layer comprising a negative magnetization.

13. The PA-MAMR write head of claim 1, wherein the PA-MAMR write head is part of a recording device in a head arm assembly, wherein the recording device is connected to a slider and a load beam, wherein the load beam is connected to a suspension configured to support the recording device and the slider.

14. A head arm assembly comprising:

a recording head including a slider and a device connected to the slider, the device including:

a main pole (MP);

a magnetic leading-edge taper (LET) disposed on a first side of a tip portion of the MP and configured to create a taper in the first side of the MP; and a spin-hall nano oscillator (SHNO) disposed adjacent to a leading shield (LS) and the LET, wherein the SHNO comprises a free layer and a spin-hall layer;

a load beam connected to the recording head; and a suspension connected to the load beam and configured to support the recording head.

15. The head arm assembly of claim 14, wherein the device further comprises:

a hot seed (HS) and a write gap (WG) disposed adjacent to the MP and configured to collect a magnetic flux from the MP;

a magnetic side shield disposed adjacent to the HS and configured to confine the magnetic flux in a cross-track direction; and an insulator at a center portion of the LET to define a current path for the SHNO.

16. The head arm assembly of claim 14, wherein the SHNO comprises the spin-hall layer comprising a negative magnetization disposed on top of the free layer such that the spin-hall layer is disposed adjacent to the LET.

17. The head arm assembly of claim 14, and wherein the free layer is disposed on top of a second spin-hall layer comprising a positive magnetization such that the free layer is disposed adjacent to the LET.

18. A method for manufacturing a write head, the method comprising:

disposing a hot seed (HS) and a write gap (WG) disposed adjacent to a main pole (MP), wherein the HS and the WG are configured to collect a magnetic flux from the MP;

disposing a magnetic side shield (SS) adjacent to the HS, the SS configured to confine the magnetic flux in a cross-track direction;

disposing a magnetic leading-edge taper (LET) on a first side of a tip portion of the MP, wherein the LET creates a taper in the first side of the MP; and disposing a spin-hall nano oscillator (SHNO) adjacent to a leading shield (LS) and the LET, wherein the SHNO comprises a free layer and a spin-hall layer.

19. The method of claim 18, further comprising:

adding an insulator to a center portion of the LET to define a current path for the SHNO.

20. The method of claim 18, further comprising:

pinning the free layer in an out-of-plane direction or an in-plane direction using synthetic anti-ferromagnetic (SAF) and/or shape anisotropy;

disposing the free layer on top of the spin-hall layer comprising a positive magnetization; and disposing a second spin-hall layer comprising a negative magnetization on top of the free layer such that the second spin-hall layer is disposed adjacent to the LET.

* * * * *